(12) United States Patent
Meurer (10) Patent No.: US 12,084,280 B2
(45) Date of Patent: Sep. 10, 2024

(54) METHOD AND SYSTEM FOR CONTROLLING THE MATERIAL FLOW OF OBJECTS IN A REAL WAREHOUSE

(71) Applicant: Dematic GmbH, Heusenstamm (DE)

(72) Inventor: Hans Christoph Meurer, Alzey (DE)

(73) Assignee: Dematic GmbH, Heusenstamm (DE)

( * ) Notice: Subject to any disclaimer, the term of this patent is extended or adjusted under 35 U.S.C. 154(b) by 829 days.

(21) Appl. No.: 17/258,828

(22) PCT Filed: Jul. 3, 2019

(86) PCT No.: PCT/EP2019/067911
§ 371 (c)(1),
(2) Date: Jan. 8, 2021

(87) PCT Pub. No.: WO2020/011628
PCT Pub. Date: Jan. 16, 2020

(65) Prior Publication Data
US 2021/0300679 A1    Sep. 30, 2021

(30) Foreign Application Priority Data

Jul. 10, 2018 (DE) ......................... 102018116611.7

(51) Int. Cl.
*B65G 1/137* (2006.01)
*G05B 19/418* (2006.01)

(52) U.S. Cl.
CPC ....... *B65G 1/137* (2013.01); *G05B 19/41885* (2013.01); *G05B 19/4189* (2013.01);
(Continued)

(58) Field of Classification Search
CPC .............. B65G 1/137; G05B 19/41885; G05B 19/4189; G05B 2219/31102;
(Continued)

(56) References Cited

U.S. PATENT DOCUMENTS 7,721,212 B2 * 5/2010 Alfandary ............ G06Q 10/087
715/965
9,102,055 B1 8/2015 Konolige et al.
(Continued)

FOREIGN PATENT DOCUMENTS

DE          60206199 T2    6/2006
DE       102009053292 A1   5/2011
(Continued)

OTHER PUBLICATIONS

International Search Report of the International Searching Authority from corresponding Patent Cooperation Treaty (PCT) Application No. PCT/EP2019/067911 and English translation, indicated completed on Oct. 29, 2019.
(Continued)

*Primary Examiner* — Michael Collins
(74) *Attorney, Agent, or Firm* — Gardner, Linn, Burkhart & Ondersma LLP (57) ABSTRACT

Controlling a conveyor installation of a real warehouse having automated machines and persons that are virtualized in a central computer for storing a virtual model of the conveyor installation having the dimensions of the individual conveyor components and the movement parameters thereof. Images of the objects to be conveyed, automated machines and persons in the conveyor installation are captured by sensors at predefined short time intervals and identified by image recognition, and the positions thereof in the conveyor installation are determined. The virtual model is continuously updated with the identification and position determination of the objects in the central computer such that a virtualized real-time model is generated, and the real conveyor installation is centrally controlled with the aid of the model, where material flow control commands are generated for the real actuators for controlling the conveying
(Continued)

movement of the automated machines to avoid endangering the persons.

13 Claims, 2 Drawing Sheets

(52) U.S. Cl.
CPC ............... *G05B 2219/31102* (2013.01); *G05B 2219/32338* (2013.01); *G05B 2219/32392* (2013.01)

(58) Field of Classification Search
CPC ........... G05B 2219/32338; G05B 2219/32392; G05B 2219/45045; G05B 17/02; Y02P 90/02
See application file for complete search history.

(56) References Cited

U.S. PATENT DOCUMENTS

| 9,607,285 | B1 | 3/2017 | Wellman | |
|---|---|---|---|---|
| 9,771,222 | B2* | 9/2017 | Schroader | B65G 43/10 |
| 10,496,061 | B2* | 12/2019 | Strohmenger | G05B 17/02 |
| 10,773,897 | B2* | 9/2020 | Schroader | B65G 47/54 |
| 2012/0303336 | A1 | 11/2012 | Becker | |
| 2014/0143065 | A1* | 5/2014 | McDermott | G06Q 30/0607 |
| | | | | 705/26.25 |
| 2014/0236555 | A1 | 8/2014 | Magato et al. | |
| 2016/0221762 | A1 | 8/2016 | Schroader | |
| 2016/0274553 | A1 | 9/2016 | Strohmenger et al. | |
| 2016/0274978 | A1* | 9/2016 | Strohmenger | G05B 15/02 |
| 2016/0277715 | A1* | 9/2016 | Mankovskii | G06T 7/55 |
| 2017/0080566 | A1* | 3/2017 | Stubbs | G06Q 10/087 |
| 2018/0046169 | A1* | 2/2018 | Shimamura | G06T 7/70 |
| 2018/0131907 | A1* | 5/2018 | Schmirler | H04N 23/698 |
| 2019/0156086 | A1* | 5/2019 | Plummer | G06T 7/248 |
| 2020/0241513 | A1* | 7/2020 | Yoshikawa | G05B 19/41885 |

FOREIGN PATENT DOCUMENTS

| EP | 2183175 | B1 | 12/2010 |
|---|---|---|---|
| EP | 3009984 | A1 | 4/2016 |
| EP | 3330201 | A1 | 6/2018 |

OTHER PUBLICATIONS

International Written Opinion of the International Searching Authority from corresponding Patent Cooperation Treaty (PCT) Application No. PCT/EP2019/067911, indicated completed on Oct. 29, 2019.
Article entitled "Decentralized Control of a Material Flow System Enabled by an Embedded Computer Vision System" by Constantin Timm et al., published in 2011.
Wikipedia webpage entitled "Speicherprogrammierbare Steuerung" in German dated Sep. 19, 2018, along with English machine translation of article accessed May 27, 2021.
Commonly Assigned Co-Pending U.S. Appl. No. 17/297,601 as filed.
Preliminary Report on Patentability of the International Searching Authority in English from corresponding Patent Cooperation Treaty (PCT) Application No. PCT/EP2019/067911, completed Jan. 12, 2021.

* cited by examiner

Fig. 1

METHOD AND SYSTEM FOR CONTROLLING THE MATERIAL FLOW OF OBJECTS IN A REAL WAREHOUSE

CROSS REFERENCE TO RELATED APPLICATION

The present invention claims the priority benefits of International Patent Application No. PCT/EP2019/067911, filed Jul. 3, 2019, and claims benefit of German patent application DE 10 2018 116 611.7, filed on Jul. 10, 2018.

BACKGROUND AND FIELD OF THE INVENTION

The invention relates to a method for controlling a real warehouse which comprises conveyor installations, automated machines and persons.

In installations including automated material flow and the simultaneous deployment of staff, persons face significant dangers from the machines which are used, such as rack serving apparatuses, conveyors, autonomous vehicles etc. on account of a very wide range of moving apparatus located in the immediate movement area of said persons (essentially collision and shearing/crushing edges).

Nowadays, in order to adhere to the relevant regulations, these machines are rendered safe individually by means of suitable systems: e.g. by fencing with secure access facilities in rack serving apparatuses and special machines, open-space monitoring with light barriers and other sensors in the case of workstations and proximity monitoring using radar etc. in the case of autonomous vehicles.

These systems can each render safe only one defined area or a delimited function.

Safety technology has in part significant effects upon the utilization of the installation. In respect of access, much larger areas are shut down than the area in which a person is actually located.

If safety systems have only a limited visual range, speed is generally reduced. The technical outlay for said safety facilities constitutes a significant portion of the total investment in an installation.

US 2014/0236555 A1 discloses allowing real data from a logistics installation to be incorporated into a virtual model thereof in order to improve or render more realistic the virtual environment in terms of the conveying flow so as to obtain improved test results.

Furthermore, the article "Decentralized Control of a Material Flow System Enabled by an Embedded Computer Vision System" (Communications Workshops (ICC), 2011 IEEE International Conference on, 20110605 IEEE-ISBN 978-1-61284-954-6; ISBN 1-61284-954-7) discloses the use of camera-based object recognition by means of markers at the level of the decentralized controllers.

SUMMARY OF THE INVENTION

The invention provides a possibility which allows staff to be safe in spite of a simplified installation design, and to minimize the effect of the safety systems on the performance of the installation and at the same time to reduce the outlay for the corresponding devices.

In accordance with the invention it has been recognized that, if an installation is controlled with a vision and emulation model, it is possible to recognize areas as being safe or free and/or to assess possible collisions or other dangers for persons by means of a virtual model of the entire warehouse including the installed conveyor equipment, extended by persons and automated machines located in the building. By reason of such safety classifications, corresponding control commands or switches of operating modes (normal, slow, stop) are sent to the automated machines. Therefore, the design of the installation can be simplified and space can also be saved. Also, in mixed environments, i.e. including staff and automated machines, in particular autonomous vehicles such as automated guided vehicles (AGV), the safety of the staff can be ensured in spite of the simplification of the installation without any reduction in the throughput of the installation.

Therefore, this is not a simulation or emulation but instead is a virtualization. Therefore, in contrast to the emulation or simulation a genuine, actually existing installation is replicated in the computer.

In the case of the method in accordance with the invention, in order to control a real warehouse which comprises conveyor installations, automated machines and persons, for which purpose the real warehouse, including conveyor installations, automated machines and persons, is virtualized in a central computer, for which purpose a virtual model of the warehouse, including the real conveyor installation, the automated machines and the persons with their dimensions and movement parameters including the actuator properties is stored, images of the objects to be conveyed, automated machines and persons in the conveyor installation are captured by means of sensors at predefined short time intervals, the objects to be conveyed, automated machines and persons are identified from the captured images in the central computer by means of image recognition and the positions thereof in the real warehouse at the time of image capture are determined, and the virtual model is continuously updated with the identification and position determination of the objects in the central computer such that a virtualized real-time model is generated therefrom and the real conveyor installation and/or the automated machines are centrally controlled with the aid of the virtualized real-time model, wherein material flow control commands are generated for the real actuators for controlling the conveying movement of the respective conveyor installations and/or automated machines in order to avoid endangering the persons.

In other words, image sensors (e.g. cameras) are installed at suitable points and capture the goods being conveyed on material flow equipment including the rack serving apparatuses and in the storage rack and in particular the working and movement areas of the automated machines and persons. The cameras transmit the images (films) in real time to a computer. Image recognition which is performed in real time is used not only to recognize the goods being conveyed and exactly determine and track their position at all times, but is also used to determine and track the positions and movements of the automated machines and persons.

On the basis of this information, the computer updates a virtual model of the conveyor installation including all of the goods being conveyed, including their position on the respective conveyor equipment and in the storage rack as well as all information relating to positions and movements of the automated machines and persons.

The virtual movement of the warehouse, including the conveyor equipment, comprises inter alia dimensions and position of the individual components and their movement parameters (speed, acceleration etc.). Therefore, situations which endanger persons in the warehouse can be predicted, recognized and prevented by means of appropriate control.

Accordingly, the central computer has preferably one module or a plurality of different modules:
- interface to the image sensors for receiving the image data;
- preparation and processing of the image data;
- image recognition and downstream identification and position determination and movement tracking of the recognised automated machines and/or persons;
- virtualised real-time model of the real warehouse with current information from the identification and position determination and movement tracking of the recognised automated machines and/or persons, downstream of the image recognition;
- interface to a warehouse management computer in order to take into account the information relating to the automated machines and/or persons;
- generation of material flow control commands for the real actuators for controlling the conveying movement of the respective automated machines in order to avoid endangering the persons.

The sensors for taking images are expediently arranged in the warehouse such that the view field of the image taking includes areas used jointly by persons and automated machines.

The goods being conveyed (which item, which order) are likewise identified by evaluation of the camera images. Therefore, a real-time model of the installation, including the goods being conveyed with all the information required for triggering actuators, is available in the computer. The computer generates from this information and the requirements of the management system (warehouse management computer, routing, objectives of the order processing etc.) commands to the actuators in order to control the material flow in a targeted manner.

Accordingly, the central computer has preferably one module or a plurality of different modules:
- interface to the sensors, cameras for receiving the image data;
- preparing and processing the image data;
- image recognition and downstream identification and position determination of the recognised goods being conveyed;
- virtualised real-time model of the real warehouse with current information from the identification and position determination of the recognised goods being conveyed, downstream of the image recognition;
- interface to the warehouse management computer in order to take into account the routing and objectives of the order processing;
- generating of material flow control commands for the real actuators for controlling the conveying movement of the respective goods being conveyed for placement into storage, storage, removal from storage, optionally sorting and conveyance thereof for order processing;

For instance, automated machines, such as autonomous vehicles, do not require any dedicated sensors and can still be operated at higher speeds.

Safety areas, e.g. in the case of shuttle systems, can be reduced in size and apparatuses can be slowed down or stopped only as they approach.

Moreover, in spite of the danger, a restricted operation can be maintained, e.g. lifts in a multi-shuttle maintenance level continue to run and thus supply the other maintenance levels if the person is located at a sufficient distance therefrom, shuttles of this maintenance level likewise continue to operate in the locations where there are no persons.

At picking stations, the location of persons is detected, and container changes or the like are effected accordingly. Particularly at picking stations, more detailed information can also be evaluated, e.g. whether an operator currently has his hand in a container and therefore the container must not be conveyed under an edge.

The safety of the proposed method can be further increased if via redundant systems a comparison of the obtained information/interpretations is effected and via further information sources comparison, e.g. thermal image, reduced amount of conventional sensors, is effected. If inconsistencies occur, the machines must be put into an intrinsically safe state in the relevant area (i.e. safe without the proposed method).

By means of the inventive control via image recognition, it is possible to save on typical sensors including cabling. The PLC hardware and software is dispensed with and is replaced by the new control computer.

This computer has more information at its disposal, with the aid of which the material flow can also be optimized. For example, the destination and the instantaneous position of each good being conveyed is known at all times and so the gaps in conveyance flow and thus the performance of a conveying line can be increased. By virtue of the omission of the traditional "PLC" and of the fact that the new control computer can run on the same platform as the warehouse management computer (e.g. Java programming language), there is no requirement for specialist discipline (PLC programmers) with the corresponding advantages in terms of the deployment of staff.

Preferably, IP cameras, which are also called network cameras, are suitable as sensors.

Preferably, the sensors for taking images are also arranged in the warehouse such that the view field of the image taking includes introducing points, discharging points, crossings and diversion points as well as placement-into-storage points and removal-from-storage points of the goods being conveyed on the conveyor components.

If the image sensors are IP cameras which are arranged such that their view field includes taking images of introducing points, discharging points, crossings and diversion points as well as placement-into-storage points and removal-from-storage points of the goods being conveyed on the conveyor components, the material flow-critical points can be effectively monitored and can still be controlled without a large number of image sensors.

It is understood that typical sensors can also still be used in parallel, depending upon requirement.

It is also possible to provide corresponding image sensors on rack serving apparatuses etc. in the area of the storage racks of the warehouse. It is thus additionally possible to determine the orientation of the objects or goods being conveyed in the rack and the occupancy. The view field of the corresponding image sensors can thus also include the storage racks.

Further features and details of the invention will be apparent from the following description of the drawings.

DESCRIPTION OF THE PREFERRED EMBODIMENTS

Figure 1:
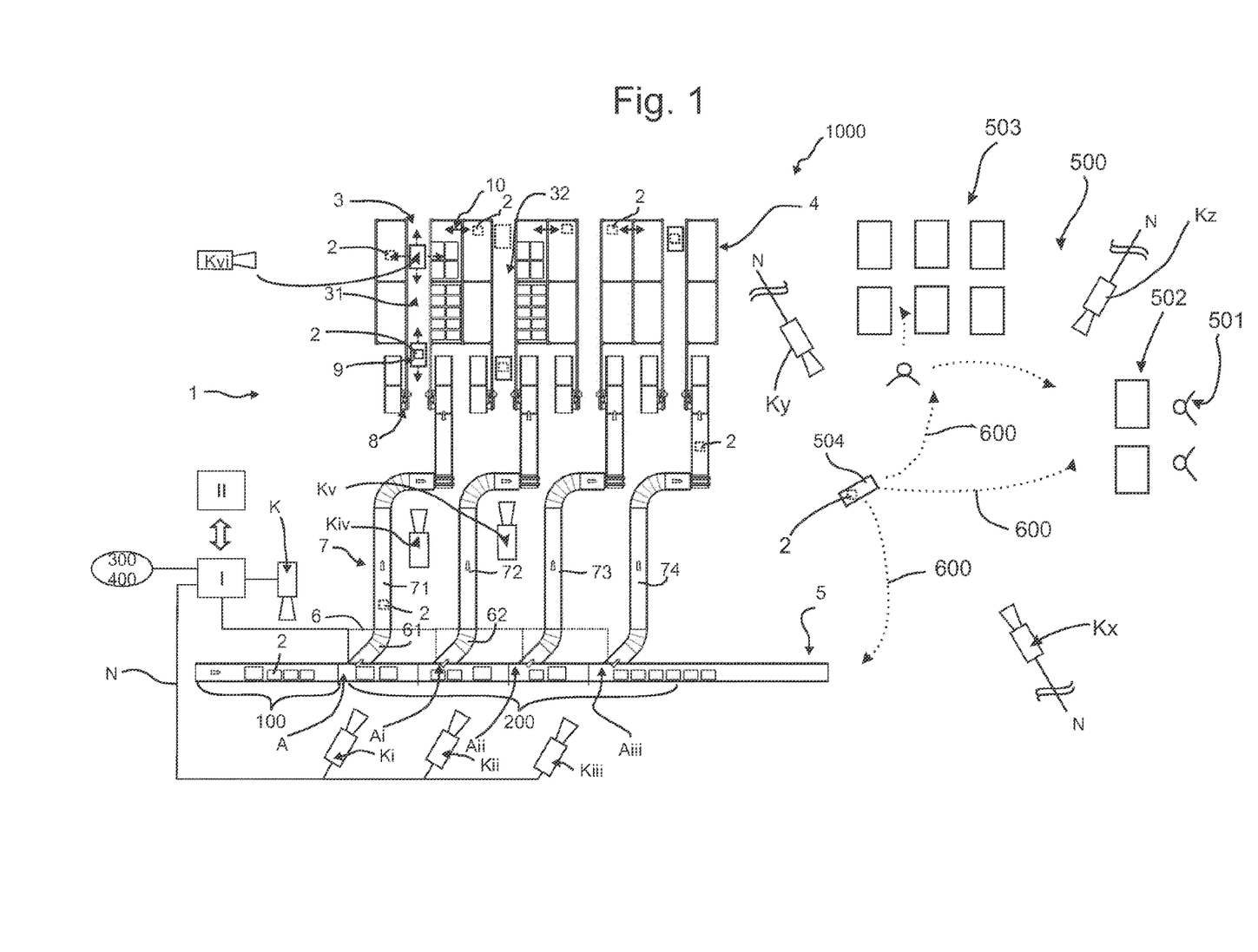
FIG. 1 shows a schematic plan view of a conveyor system and a rack store for placing packets into and out of storage.

FIG. 1 shows a plan view of a part of a central warehouse 1000 with a conveyor system 1 for placing packets 2 into storage in storage rack aisles 3 which are formed by storage racks 4 which are arranged in parallel with and opposite each other and have a plurality of levels.

The conveyor system 1 includes a distribution path 5 which conveys packets 2 into and out of storage. Incoming and outgoing paths 7 are arranged between the distribution path 5 and the storage racks 4. These paths are connected to the distribution path 5 by introducing and discharging areas 6 and are connected to the storage rack aisles 3 via goods lifts 10. Adjacent incoming/outgoing paths 71 and 72, 73 . . . are arranged in parallel with each other.

The packets 2 are transported by the goods lifts 8 from the incoming paths 7 into the rack levels of the storage racks 4 or from the storage levels to the outgoing paths 7. The packets 2 are transported within the rack levels of the storage racks 4 via rack serving apparatuses 9.

Preferably, a rack serving apparatus 9, e.g. a shuttle vehicle, moves on each rack level. The rack serving apparatus 9 is equipped with load picking-up means, e.g. telescoping arms which permit a transfer up to a transport surface of the rack serving apparatus 9 or down from a transport surface of a rack serving apparatus 9.

The method when placing packets 2 into storage will be explained hereinafter with the aid of FIG. 1.

In the region of the feed 100, images of the distribution path 5, on which e.g. a packet 2 is moved, are taken at short intervals by an IP camera K.

The image data from the IP camera K are communicated via a network N to a computer I and are prepared and processed so that they can be used in an image recognition module 300 for downstream identification and position determination 400 of the goods being conveyed or the packet 2 located on the distribution path 5.

Moreover, a real-time model of the warehouse 1000, including the conveyor installation 1, is virtualized in the computer I, for which purpose a virtual model of the real conveyor installation 1 with the dimensions of the individual conveyor components and their movement parameters, including the actuator properties, is stored.

This model is continuously updated with the current information from the identification and position determination 400 of the recognized goods being conveyed, downstream of the image recognition 300.

For this purpose, further IP cameras Ki, ii, iii etc., of which the image data are likewise incorporated into the virtual model, are arranged at suitable points.

The cameras K are all connected to the computer I via known network technology via power-over-Ethernet connections N.

The virtual model can centrally control the real conveyor installation 1 with the aid of the virtualized real-time model, for which purpose information is also incorporated with the superordinate warehouse management controller II via suitable interfaces in order to take into account the routing and objectives of the order processing.

From this, the computer I generates material flow control commands for the real actuators A, Ai, Aii, Aiii etc. for controlling the conveying movement of the respective goods being conveyed or packets 2 on the distribution path 5 and also for placement into storage, storage, removal from storage, optionally sorting and conveyance thereof for order processing.

Therefore, in the present case the actuator 6 of the discharging area 6 is activated for the packet 2, recognized in the area of the feed 100, according to its speed such that the packet 2 passes onto the discharging area 61 and thus onto the path 71.

The actuator A—designed as a slide—of the discharging area 6 is thus controlled by the computer I on the basis of the virtualized real-time model with the aid of camera data such that the packet 2 is discharged.

It is understood that the computer I or the controller running therein also controls the distribution path 5, which is designed as a roller conveyor, on the basis of the virtualized real-time model.

A packet 2 is thus conveyed on the distribution path 5 for placement into storage and after passing through a discharging area 61 it passes via the incoming path 71 to the goods lift 8. From the goods lift 8, the packet 2 is received by a rack serving apparatus 9 and thus placed into storage into a destination rack aisle 31 or corresponding storage rack of the aisle.

A camera Kvi is likewise provided on the rack serving apparatus 9 and takes images of the rack 4 during travel and thus permits real-time capture of the occupancy and orientation of the packets in the rack.

In this case, no light barriers or other sensors are required. The material flow of the packet 2 is controlled solely by means of the image data obtained from the cameras K and the packets and their position or speed identified therefrom.

However, typical sensors, such as light barriers or light scanners can also be used additionally or in sections in order to combine e.g. conventional modules.

The distribution center 1000 also includes an area 500 in which persons 501 are active, e.g. working at manual picking stations 502, manually placing and removing particular goods into and from storage in a dedicated storage area 503, processing returns or even performing installation maintenance.

In addition, autonomous vehicles 504 (AGV) are also travelling in the distribution center 1000, exchanging goods or packets 2 between transfer points of the distribution path 5 and the area 500.

Therefore, since the movement paths 600 of the autonomous vehicles 504 and the persons 201 overlap, there is a risk of collisions.

Images depicting the persons 501 and AGV 504 are taken in the region 500 (in a similar manner to the description above) at short intervals by appropriately placed IP cameras Kx,y,z.

The image data from the IP cameras Kx,y,z are communicated, in turn, via the network N to the computer I and prepared and processed so that they can be used in the image recognition module 300 for image recognition and downstream identification and position determination and movement tracking of the recognized automated machines 504 and persons 501.

For this purpose, dimensions and movement parameters, including the actuator properties of the persons 501 and AGV 504, are stored in the computer I in the real-time model of the warehouse 1000.

This model is continuously updated with the current information from the identification and position determination and movement tracking 400 of the recognized persons 501 and AGV 504, downstream of the image recognition 300.

The virtual model can centrally control the real warehouse 1000, including the AGV 504 with the aid of the virtualized real-time model, for which purpose information is also incorporated with the superordinate warehouse management controller II via suitable interfaces in order to take into account the routing and objectives of the order processing for the AGV 504.

From this, the computer I generates material flow control commands for the real actuators A, Ai, Aii, Aiii etc. for controlling the movement of the respective AGV 504 in the area 500, taking necessary paths 300 into account.

The movement data are used for determining potential dangers and, if a danger to persons is established, control commands are generated for the AGV 504 which eliminate the danger. These can be simple standstill commands to stop immediately or even evasion commands to bypass the danger area. Slow travel could also be initiated. Therefore, the real actuators (drives, steering etc.) for controlling the conveying movement of the respective automated machines 504 are changed.

In a similar manner, the movements of the rack serving apparatuses 9 are monitored and in the event of danger to maintenance staff appropriate control commands are generated.

Accordingly, moving components of the picking stations 502 are also monitored to check for any danger to the staff 501 and are controlled or stopped in a targeted manner.

Therefore, overall a new level of quality of safety is achieved in the entire warehouse 1000 because safety conditions which are optimized according to requirement without any unnecessary slowing down or standstill are made possible in the mixed operation without any separate (e.g. fenced off) safety zones for automatic areas by reason of the image data-supported monitoring and control.

Figure 2:
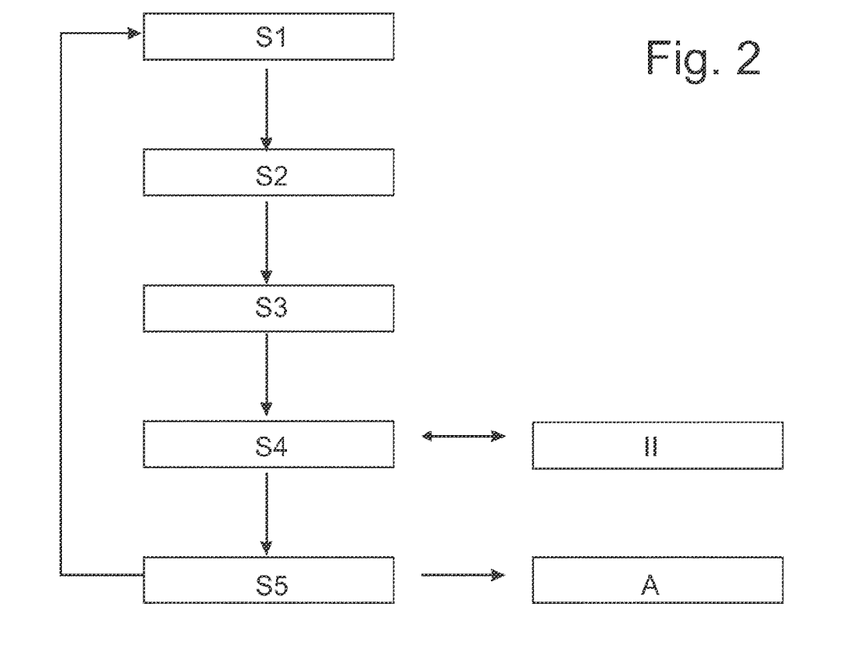
FIG. 2 shows a schematic flow diagram of the control method.

The sequence of control will be explained once again hereinafter with reference to FIG. 2.

As mentioned, image data are continuously captured by the IP cameras K, Ki, Kii . . . Kx,y,z (step S1) and the data from the IP cameras K, Ki, Kii . . . Kx,y,z are communicated to the computer I via the network N (step S2).

In the computer I, identification and position determination of the goods being conveyed are performed in the modules 300 and 400 from the image data (step S3).

The identification is effected by means of image recognition in the module 300 on the basis of the dimensions of the goods being conveyed and external features. Communication with the warehouse management controller II provides information relating to the expected packets and their properties in order to facilitate or confirm the identification. For instance, the respective orientation can also be recognized and where appropriate a change can be instigated by the controller.

The downstream position determination in the module 400 is effected on the basis of the known location of the camera K, which provides the respective image data, and of the speed etc. calculated from the difference images.

In the computer I, identification and position determination as well as movement tracking of the recognized automated machines 9, 504 and persons 501 are also performed in the modules 300 and 400 from the image data (step S3).

The identification is effected by means of image recognition in the module 300 on the basis of the known locations of the cameras and external features of the automated machines 9, 504 and persons 501, for which purpose these are marked where appropriate to facilitate this.

Communication with the warehouse management controller II provides information relating to the expected positions in order to facilitate or confirm the identification.

The downstream position determination and movement tracking in the module 400 are effected on the basis of the known location of the respective camera K which provides the respective image data and the speed etc. calculated from difference images. For instance, the respective movement of the automated machines 9, 504 can also be recognized and where appropriate a change can be instigated by the controller.

With this current data, the real-time model virtualized in the computer I is continuously updated so that at all times it is known where the automated machines, persons and goods being conveyed are located in the system and how they are currently moving.

In order to calculate control commands for the conveyor installation from this, data from the warehouse management controller II are also incorporated via suitable interfaces in order to take into account the routing and objectives of the order processing.

From this information, the control commands for the respective actuators are then calculated and communicated to the actuators (step S5), wherein potential dangers are taken into account and, if a danger to persons is established, the control commands for actuators of the automated machines are modified such that the danger is eliminated or prevented by anticipatory action.

The sequence then begins anew.

The invention claimed is:

1. A method for controlling a real warehouse which comprises conveyor installations, automated machines and persons, said method comprising:
   virtualizing in a central computer the real warehouse, including conveyor installations, automated machines and persons, whereby a virtual model of the warehouse, including the real conveyor installation, the automated machines and the persons with their dimensions and movement parameters, including properties of actuators, is stored;
   capturing images of the objects to be conveyed, automated machines and persons in the conveyor installation by sensors at predefined short time intervals;
   identifying the objects to be conveyed, automated machines and persons from the captured images in the central computer via image recognition, and determining the positions thereof in the real warehouse at the time of image capture; and
   continuously updating the virtual model with the identification and position determination of the objects in the central computer such that a virtualized real-time model is generated therefrom and the real conveyor installation and/or the automated machines are centrally controlled with the aid of the virtualized real-time model, wherein material flow control commands are generated for the real actuators for controlling the conveying movement of the respective conveyor installations and/or automated machines in order to avoid endangering the persons.

2. The method as claimed in claim 1, wherein the sensors comprise cameras.

3. The method as claimed in claim 2, wherein the cameras communicate their captured images to the central computer via an IP network.

4. The method as claimed in claim 1, wherein the central computer comprises one module or a plurality of different modules configured and operable for:
   interface to the image sensors for receiving image data;
   preparing and processing the image data;
   image recognition and downstream identification and position determination and movement tracking of the recognized automated machines and/or persons;

virtualized real-time model of the real warehouse with current information from the identification and position determination and movement tracking of the recognized automated machines and/or persons, downstream of the image recognition;

interface to a warehouse management computer in order to take into account the information relating to the automated machines and/or persons;

generation of material flow control commands for the real actuators for controlling the conveying movement of the respective automated machines in order to avoid endangering the persons.

5. The method as claimed in claim 4, wherein the sensors for capturing images are arranged in the warehouse such that the view field of the image capturing includes areas used jointly by persons and automated machines.

6. The method as claimed in claim 1, wherein the central computer comprises one module or a plurality of different modules configured and operable for:

interface to the image sensors for receiving image data;
preparation and processing of the image data;
image recognition and downstream identification and position determination of the recognized objects being conveyed;
virtualized real-time model of the real warehouse with current information from the identification and position determination of the recognized objects being conveyed, downstream of the image recognition;
interface to a warehouse management computer in order to take into account the routing and objectives of the order processing and exchange of information relating to the objects being conveyed;
generation of material flow control commands for the real actuators for controlling the conveying movement of the respective objects being conveyed for placement into storage, storage, removal from storage, optionally sorting and conveyance thereof for order processing.

7. The method as claimed in claim 6, wherein the sensors for capturing images are arranged in the warehouse such that the view field of the image capturing includes introducing points, discharging points, crossings and diversion points of the objects being conveyed on the conveyor components and the storage racks.

8. The method as claimed in claim 1, wherein the sensors for image capturing are arranged in the warehouse such that the view field of the image capturing includes areas used jointly by persons and automated machines.

9. The method as claimed in claim 8, wherein the central computer comprises one module or a plurality of different modules configured and operable for:

interface to the image sensors for receiving image data;
preparing and processing the image data;
image recognition and downstream identification and position determination and movement tracking of the recognized automated machines and/or persons;
virtualized real-time model of the real warehouse with current information from the identification and position determination and movement tracking of the recognized automated machines and/or persons, downstream of the image recognition;
interface to a warehouse management computer in order to take into account the information relating to the automated machines and/or persons;
generation of material flow control commands for the real actuators for controlling the conveying movement of the respective automated machines in order to avoid endangering the persons.

10. The method as claimed in claim 8, wherein the central computer comprises one module or a plurality of different modules configured and operable for:

interface to the image sensors for receiving the image data;
preparation and processing of image data;
image recognition and downstream identification and position determination of the recognized objects being conveyed;
virtualized real-time model of the real warehouse with current information from the identification and position determination of the recognized objects being conveyed, downstream of the image recognition;
interface to a warehouse management computer in order to take into account the routing and objectives of the order processing and exchange of information relating to the objects being conveyed;
generation of material flow control commands for the real actuators for controlling the conveying movement of the respective goods being conveyed for placement into storage, storage, removal from storage, optionally sorting and conveyance thereof for order processing.

11. The method as claimed in claim 1, wherein the sensors for capturing images are arranged in the warehouse such that the view field of the image capturing includes introducing points, discharging points, crossings and diversion points of the objects being conveyed on the conveyor components and the storage racks.

12. The method as claimed in claim 11, wherein the central computer comprises one module or a plurality of different modules configured and operable for:

interface to the image sensors for receiving image data;
preparing and processing the image data;
image recognition and downstream identification and position determination and movement tracking of the recognized automated machines and/or persons;
virtualized real-time model of the real warehouse with current information from the identification and position determination and movement tracking of the recognized automated machines and/or persons, downstream of the image recognition;
interface to a warehouse management computer in order to take into account the information relating to the automated machines and/or persons;
generation of material flow control commands for the real actuators for controlling the conveying movement of the respective automated machines in order to avoid endangering the persons.

13. The method as claimed in claim 11, wherein the central computer comprises one module or a plurality of different modules configured and operable for:

interface to the image sensors for receiving image data;
preparation and processing of the image data;
image recognition and downstream identification and position determination of the recognized objects being conveyed;
virtualized real-time model of the real warehouse with current information from the identification and position determination of the recognized objects being conveyed, downstream of the image recognition;
interface to a warehouse management computer in order to take into account the routing and objectives of the order processing and exchange of information relating to the objects being conveyed;
generation of material flow control commands for the real actuators for controlling the conveying movement of the respective objects being conveyed for placement into storage, storage, removal from storage, optionally sorting and conveyance thereof for order processing.

\* \* \* \* \*

UNITED STATES PATENT AND TRADEMARK OFFICE
CERTIFICATE OF CORRECTION

| | | |
|---|---|---|
| PATENT NO. | : 12,084,280 B2 | Page 1 of 1 |
| APPLICATION NO. | : 17/258828 | |
| DATED | : September 10, 2024 | |
| INVENTOR(S) | : Hans Christoph Meurer | |

It is certified that error appears in the above-identified patent and that said Letters Patent is hereby corrected as shown below:

In the Claims

Column 10, Claim 10:
Line 4, delete "the" after "receiving"
Line 6, insert --the-- after "of"
Line 20, "goods" should be --objects--

Signed and Sealed this
Fifteenth Day of October, 2024

Katherine Kelly Vidal
*Director of the United States Patent and Trademark Office*